(12) United States Patent
Sako

(10) Patent No.: US 9,878,626 B2
(45) Date of Patent: Jan. 30, 2018

(54) ELECTRIC MOBILE BODY, POWER SUPPLY/RECEPTION SYSTEM, AND POWER RECEIVING METHOD FOR ELECTRIC MOBILE BODY

(71) Applicant: Sony Corporation, Tokyo (JP)

(72) Inventor: Yoichiro Sako, Tokyo (JP)

(73) Assignee: SONY CORPORATION, Tokyo (JP)

( * ) Notice: Subject to any disclaimer, the term of this patent is extended or adjusted under 35 U.S.C. 154(b) by 104 days.

(21) Appl. No.: 14/405,570

(22) PCT Filed: May 16, 2013

(86) PCT No.: PCT/JP2013/063653
§ 371 (c)(1),
(2) Date: Dec. 4, 2014

(87) PCT Pub. No.: WO2013/187178
PCT Pub. Date: Dec. 19, 2013

(65) Prior Publication Data
US 2015/0142238 A1    May 21, 2015

(30) Foreign Application Priority Data
Jun. 14, 2012    (JP) .................................. 2012-134392

(51) Int. Cl.
*B60L 11/00* (2006.01)
*B60L 11/18* (2006.01)
(Continued)

(52) U.S. Cl.
CPC ............ *B60L 11/1816* (2013.01); *B60L 7/12* (2013.01); *B60L 7/14* (2013.01); *B60L 11/002* (2013.01);
(Continued)

(58) Field of Classification Search
None
See application file for complete search history.

(56) References Cited

U.S. PATENT DOCUMENTS 8,321,194 B2 * 11/2012 Meagher .............. H02J 13/001
700/286
8,571,955 B2 * 10/2013 Al Faruque ............ G06Q 40/00
705/35
(Continued)

FOREIGN PATENT DOCUMENTS

| JP | 2001-184406 | 7/2001 |
|---|---|---|
| JP | 2006-074868 | 3/2006 |

(Continued)

*Primary Examiner* — Truc M Do
(74) *Attorney, Agent, or Firm* — Paratus Law Group, PLLC

(57) ABSTRACT

A power control apparatus 10 to supply power, which can be packet transmitted/received, having predetermined identification information in a header part, to a plurality power consumption apparatuses 70 from outside includes (a) an identification information separation apparatus 20 for receiving the identification information and separating it, (b) a power reception propriety determination apparatus 30 for determining whether to receive the power based on the separated identification information, and (c) a power supply control apparatus 40 for controlling the power supply to the power consumption apparatus 70 connected to a power control apparatus based on the separated identification information.

12 Claims, 6 Drawing Sheets

(51) Int. Cl.
   *B60L 7/12*     (2006.01)
   *B60L 7/14*     (2006.01)
   *B60L 11/14*    (2006.01)
   *H02J 3/32*     (2006.01)
   *H01M 10/42*    (2006.01)
   *H01M 10/44*    (2006.01)

(52) U.S. Cl.
   CPC .......... *B60L 11/005* (2013.01); *B60L 11/007* (2013.01); *B60L 11/14* (2013.01); *B60L 11/184* (2013.01); *B60L 11/185* (2013.01); *B60L 11/1809* (2013.01); *B60L 11/1838* (2013.01); *B60L 11/1844* (2013.01); *B60L 11/1846* (2013.01); *B60L 11/1848* (2013.01); *B60L 11/1861* (2013.01); *H01M 10/42* (2013.01); *H02J 3/32* (2013.01); *B60L 2200/12* (2013.01); *B60L 2200/14* (2013.01); *B60L 2200/22* (2013.01); *B60L 2200/24* (2013.01); *B60L 2200/34* (2013.01); *B60L 2210/40* (2013.01); *B60L 2240/12* (2013.01); *B60L 2240/14* (2013.01); *B60L 2240/421* (2013.01); *B60L 2240/441* (2013.01); *B60L 2240/70* (2013.01); *B60L 2250/16* (2013.01); *H01M 10/44* (2013.01); *H01M 2010/4278* (2013.01); *H01M 2220/20* (2013.01); *Y02E 60/721* (2013.01); *Y02T 10/642* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 8,725,330 B2* | 5/2014 | Failing | B60L 3/00 701/22 |
| 8,884,579 B2* | 11/2014 | Hondo | H02J 3/32 320/101 |
| 9,153,966 B2* | 10/2015 | Ishida | B60L 11/1816 |
| 9,393,878 B1* | 7/2016 | Failing | B60L 3/00 |
| 2002/0081468 A1* | 6/2002 | Shioya | H01M 8/04 429/420 |
| 2002/0106540 A1* | 8/2002 | Shioya | C01B 3/323 429/410 |
| 2009/0066287 A1* | 3/2009 | Pollack | G06Q 50/00 320/101 |
| 2009/0096416 A1* | 4/2009 | Tonegawa | B60K 6/445 320/109 |
| 2009/0313103 A1* | 12/2009 | Ambrosio | B60L 8/00 705/14.25 |
| 2010/0038156 A1* | 2/2010 | Fujitake | B60K 6/445 180/65.22 |
| 2011/0084664 A1* | 4/2011 | White | B60L 11/1816 320/134 |
| 2011/0276194 A1* | 11/2011 | Emalfarb | B60L 11/1838 700/297 |
| 2013/0015812 A1* | 1/2013 | Boyer | B60L 11/182 320/108 |
| 2013/0096725 A1* | 4/2013 | Ishida | G05B 11/01 700/286 |
| 2013/0124005 A1* | 5/2013 | Ichikawa | H04L 25/028 701/1 |
| 2013/0241466 A1* | 9/2013 | Mitsuda | H01M 10/441 320/103 |
| 2014/0222237 A1* | 8/2014 | Hibiya | H02J 3/14 700/295 |
| 2014/0347017 A1* | 11/2014 | Sugano | B60L 1/003 320/137 |

FOREIGN PATENT DOCUMENTS

| | | |
|---|---|---|
| JP | 2007-185083 | 7/2007 |
| JP | 2008-131841 | 6/2008 |
| JP | 2009-070083 | 4/2009 |
| JP | 2009-240081 | 10/2009 |
| JP | 2010-124652 | 6/2010 |
| JP | 2011-229276 | 11/2011 |

* cited by examiner

ELECTRIC MOBILE BODY, POWER SUPPLY/RECEPTION SYSTEM, AND POWER RECEIVING METHOD FOR ELECTRIC MOBILE BODY

CROSS REFERENCE TO PRIOR APPLICATION

This application is a National Stage Patent Application of PCT International Patent Application No. PCT/JP2013/063653 (filed on May 16, 2013) under 35 U.S.C. §371, which claims priority to Japanese Patent Application No. 2012-134392 (filed on Jun. 14, 2012), which are all hereby incorporated by reference in their entirety.

TECHNICAL FIELD

The present disclosure relates to an electric mobile body such as an electric vehicle, a power supply/reception system in which a charging station (ground charging device) and the electric mobile body such as the electric vehicle are combined, and a power receiving method for the electric mobile body such as the electric vehicle.

BACKGROUND ART

The utilization of renewable energy has been highlighted to reduce greenhouse gas (carbon dioxide gas) emission. For example, JP 2008-131841 A has disclosed a technique for using the renewable energy in an electric vehicle (EV). Specifically, Patent Document 1 discloses a renewable energy using system including a renewable energy generation unit for generating power by using the renewable energy and a mobile body charging unit for charging a secondary battery of the mobile body, which moves by taking out electric energy from the secondary battery, by using the electric energy generated by the power generation according to the renewable energy generation unit. Also, for example, JP 2006-074868 A discloses a battery charging system of an electric vehicle including a communication unit which can transmit charging information of a battery mounted on the electric vehicle to outside. The battery charging system of the electric vehicle includes a service system which collectively manages battery information of individual users previously registered and sets a charging schedule based on present battery information transmitted from each vehicle and the previously accumulated battery information and a non-contact charging power supply system which is communicably connected to the service system and supplies the power to charge the battery without contacting with the vehicle according to an instruction from the service system.

Also, JP 2001-184406 A discloses a power supply system in which a customer can select the power generated by the green energy. The invention regarding the power supply system includes a notification control unit which notifies a power user of a kind of a power generation and its selling price by using a communication line, a power distribution control unit which receives a reservation instruction of the kind of the power source, its amount of consumption, or date to use the power transmitted from the power users via the communication line and instructs each power generating facility for each power source to supply the power by the amount of power consumption via the communication line, a use result database which records the kind of the power source and the amount of the power consumption for each power user, and a billing work control unit which calculates a power usage charge based on the kind of the power source, the amount of the power consumption, and the price for a certain period of time recorded in the use result database for each power user and charges to the power customer.

CITATION LIST

Patent Document

Patent Document 1: JP 2008-131841 A
Patent Document 2: JP 2006-074868 A
Patent Document 3: JP 2001-184406 A

SUMMARY OF THE INVENTION

Problems to be Solved by the Invention

However, in the techniques disclosed in Patent Documents 1 to 3, a technique in which the electric mobile body such as the electric vehicle inquires what kind of power can be supplied and selects whether to receive the power based on the result of the inquiry has not been mentioned.

Therefore, a purpose of the present disclosure is to provide an electric mobile body, a power supply/reception system, and a power receiving method for the electric mobile body in which the electric mobile body can inquire what kind of power can be supplied and select whether to receive the power based on the result of the inquiry.

Solutions to Problems

The electric mobile body of the present disclosure to achieve the above-mentioned purpose includes a power reception propriety determination unit which transmits a request signal for requesting to send information about the power to a power supply device, receives the information about the power from the power supply device, and determines whether the power can be received and a power reception unit which receives the power from the power supply device.

The power supply/reception system of the present disclosure to achieve the above-mentioned purpose includes a power supply device and an electric mobile body. The electric mobile body includes a power reception propriety determination unit which transmits a request signal for requesting to send information about power to the power supply device, receives the information about the power from the power supply device, and determines whether the power can be received and a power reception unit which receives the power from the power supply device. The power supply device includes an information transmission unit which receives the request signal from the power reception propriety determination unit of the electric mobile body and transmits the information about the power to the electric mobile body and a power supply unit which supplies the power to the electric mobile body.

The power receiving method for the electric mobile body of the present disclosure to achieve the above-mentioned purpose is to transmit a request signal for requesting to send information about power to a power supply device, receive the information about the power from the power supply device, determines whether the power can be received based on the information about the power, and receives the power from the power supply device when a determination to receive the power has been made.

Effects of the Invention

In an electric mobile body or a power supply/reception system of the present disclosure, the electric mobile body includes a power reception propriety determination unit which transmits a request signal for requesting to send information about power to a power supply device, receives the information about the power from the power supply device, and determines whether the power can be received. Also, a power receiving method for the electric mobile body of the present disclosure is to transmit the request signal for requesting to send the information about the power to the power supply device, to receive the information about the power from the power supply device, and determine whether the power can be received based on the information about the power. Therefore, a user and the like of the electric mobile body can surely receive the power from a power generator from which the user desires to receive the power (for example, renewable energy and green energy). On the other hand, the user can surely reject to receive the power from the power generator from which the user does not desire to receive the power.

MODE FOR CARRYING OUT THE INVENTION

Figure 1A:
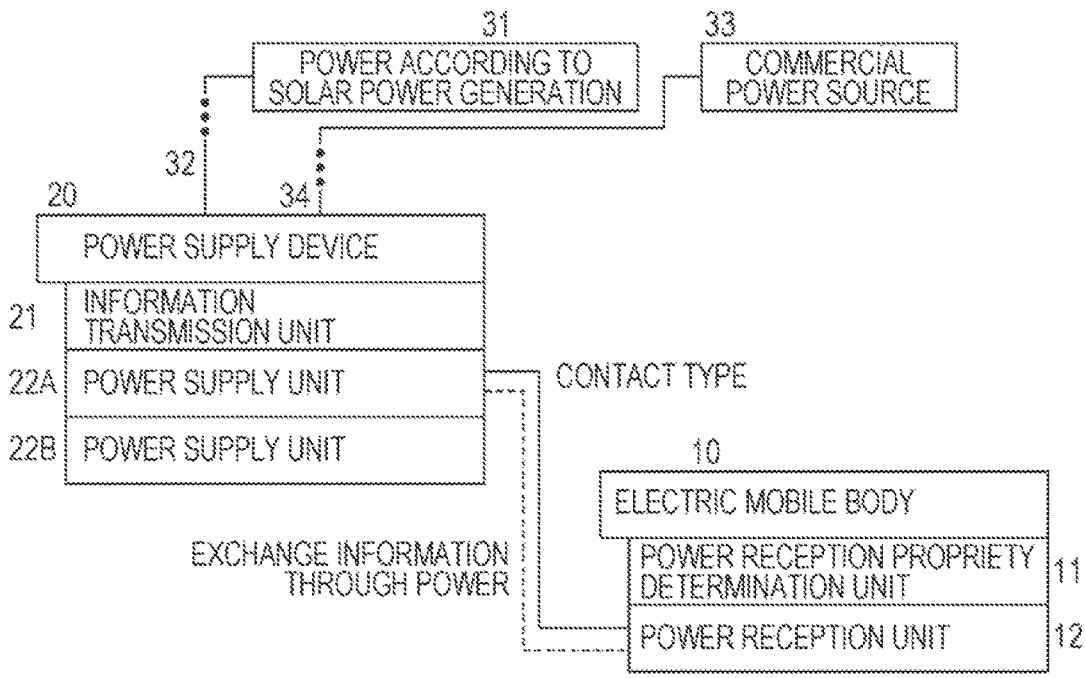
FIGS. 1A and 1B are respectively conceptual diagrams of an electric mobile body and a power supply/reception system of a first embodiment and a second embodiment.

The present disclosure will be described below based on the embodiments with reference to the drawings. However, the present disclosure is not limited to the embodiments, and various values and materials in the embodiments are exemplary.

The description will be in the following order.
1. Description regarding electric mobile body, power supply/reception system, and power receiving method for electric mobile body of the present disclosure in general.
2. First embodiment (electric mobile body, power supply/reception system, and power receiving method for electric mobile body of the present disclosure)
3. Second embodiment (modification of first embodiment)
4. Third embodiment (modifications of first and second embodiments)
5. Fourth embodiment (another modification of first and second embodiments)
6. Fifth embodiment (modification of first to fourth embodiments)
7. Sixth embodiment (modification of first to fifth embodiments) and other

[Description Regarding Electric Mobile Body, Power Supply/Reception System, and Power Receiving Method for Electric Mobile Body of the Present Disclosure in General]

An electric mobile body of the present disclosure can be in a mode in which when a power reception propriety determination unit has determined to receive power, the power reception propriety determination unit transmits a power supply request signal for requesting power supply to a power supply device. Also, a power supply/reception system of the present disclosure can be in a mode in which when the power reception propriety determination unit of the electric mobile body has determined to receive the power, the power reception propriety determination unit of the electric mobile body transmits the power supply request signal for requesting the power supply to the power supply device. In addition, a power receiving method for the electric mobile body of the present disclosure can be in a mode in which when the determination to receive the power has been made, the power supply device is requested to supply power. In these cases, the power supply request signal can include information about a power supply method, and the information about the power supply method can be transmitted when the power supply device is requested to supply power. Here, for example, information for distinguishing a normal charge method from a rapid charge method to charge a secondary battery provided in the electric mobile body can be exemplified as the information about the power supply method. It is preferable that the power supply device supply the power having an appropriate specification to the electric mobile body according to the power supply request signal. When the power supply device cannot supply the power having the appropriate specification to the electric mobile body according to the power supply request signal, the power supply is stopped.

In the electric mobile body of the present disclosure, the power supply/reception system of the present disclosure, or the power receiving method for the electric mobile body of the present disclosure including the above preferable modes, the information about the power can include information indicating whether the power is the renewable energy. Also, the information about the power can include information to identify power based on solar power generation, power based on solar thermal power generation, power based on wind power generation, power based on geothermal power generation, power based on biomass power generation, power based on power generation by ocean thermal energy conversion, power based on tidal power, power based on thermal power generation, power based on hydropower generation, power based on natural gas, power based on nuclear power generation, and power based on other power generation.

Further, in the electric mobile body of the present disclosure, the power supply/reception system of the present disclosure, and the power receiving method for the electric mobile body of the present disclosure including the above preferable modes and configurations, the information about the power can be transported by the power. Specifically, for example, it is preferable that the information about the power be transported by the power based on a power line communication (PLC) technique. Also, the electric mobile body can further include a communication apparatus, and the request signal and the information about the power can be transmitted/received via the communication apparatus. Not only the electric mobile body and the communication apparatus built in the electric mobile body but also a communication apparatus and a communication circuit included in a car navigation system and a personal computer, a mobile phone, a PDA, a tablet terminal, a smartphone, and the like can be exemplified as the communication apparatus. When the request signal and the information about the power is transmitted/received via the communication apparatus, a wireless system, a communication line, a public line, infrared rays, and the like can be used.

The power supplied to the electric mobile body can include, for example, a packet structure including a header part and a payload. In this case, the payload corresponds to the power, and the header part can include the information about the power, information indicating whether the power is the renewable energy, or information to identify the power based on each power generator. As the information included in the header part, specifically, the following information can be exemplified. (A) information indicating whether the power is the renewable energy or information for identifying the power based on various power generators (specifically, power generator information or a code and ID regarding a kind of the power, and more specifically, information regarding kinds of the power, for example, the thermal power generation using oil and coal; the power based on natural gas; the nuclear power generation; the hydropower generation; and the green energy or the renewable energy using natural power such as the solar power generation, the solar thermal power generation, the wind power generation, the geothermal power generation, the biomass power generation, the tidal power generation, the power generation by ocean thermal energy conversion) (B) information about a power supply amount (value of supplied power) (C) a power amount which is a payload length of the payload (D) an AC/DC discrimination flag for discriminating (E) a value of a voltage (F) a code and an ID of a country and an area (G) a code and an ID of power generating/manufacturing/distributing company (H) a flag for distinguishing commercial/private power (I) a power transmission source address (J) power transmission source identification information (K) a power transmission destination address (L) power transmission destination identification information (M) a next head tag (N) a unit price (O) carbon dioxide emissions per power generation unit time (P) information about a power transmission/distribution path. In this case, it is preferable that the power reception propriety determination unit include a packet disassemble unit. According to circumstances, the power reception propriety determination unit may include a packet generation unit.

A determination of the power reception propriety determination unit to receive the power can be made, for example, based on coincidence/non-coincidence between the power generator information or the code and ID regarding the kind of the power included in the header part of the packet structure or the power generator information or the code and ID regarding the kind of the power transmitted via the wireless system, the communication line, the public line, the infrared rays, and the like and those stored in the power reception propriety determination unit of the electric mobile body.

It is preferable that the power reception propriety determination unit of the electric mobile body include, for example, a combination of a CPU and a storage unit (memory and the like), and it is also preferable that the information transmission unit of the power supply device include, for example, the combination of the CPU, the storage unit (memory and the like), and a communication unit. A charge coupler for configuring the power reception unit of the electric mobile body and the power supply unit of the power supply device may be a contact type and a non-contact type. When the charge coupler is the contact type, it is preferable that the power reception unit of the electric mobile body and the power supply unit of the power supply device be configured from the connector. In this case, the above-mentioned transmission/reception of the request signal and the information about the power may be performed via the connector. Also, when the charge coupler is the non-contact type, specifically, a microwave method, an electromagnetic induction method, a magnetic field resonance method, and an electric field resonance method can be exemplified. For example, power transmission can be performed by combining a power transmission antenna (power supply unit) and a power reception rectenna (power reception unit), or facing a coil (power supply unit) to a coil (power reception unit), or combining a power transmission side antenna (power supply unit) and a power reception side antenna (power reception unit) and electromagnetically energizing via a space therebetween.

The power supply device may include the single power supply unit and the plurality of power supply units. When the power supply device includes the single power supply unit, the single power supply unit supplies power from various power generators (power generation sources). On the other hand, when the power supply device includes the plurality of power supply units, a mode in which the plurality of power supply units respectively supplies the power from various power generators (power generation sources) may be employed, and a mode in which the single power supply unit supplies the power from one power generator (power generation source) out of various power generators (power generation sources) may be employed. That is, for example, a mode may be employed in which the power supply device includes the single power supply unit and the single power supply unit supplies an N kinds of the power such as the power based on the thermal power generation, (so-called power from the commercial power source), and the power based on the solar power generation (green energy or renewable energy). Also, a mode may be employed in which the power supply device includes N power supply units and the respective N power supply units supply the N kinds of the power such as the power based on the thermal power generation and the power based on the solar power generation. A green energy source or a renewable energy source such as a solar power generator may be provided apart from the power supply device and may be provided adjacent to the power supply device or provided together with the power supply device.

As the electric mobile body, an electric vehicle, an electric motorcycle, a power assisted bicycle, a so-called mobility scooter, an electric wheelchair, a golf cart, an electric cart, a Segway (registered trademark), a carrying truck, and a work vehicle can be exemplified. Also, an aircraft and a ship can be exemplified. The electric mobile body includes, for example, a battery pack including a plurality of secondary batteries and a control apparatus for charging/discharging the battery pack mounted therein. Here, a lithium-ion secondary battery, a magnesium-ion secondary battery, an aluminum-ion secondary battery, a lead storage battery, a nickel-cadmium secondary battery, and a nickel-hydrogen secondary battery can be exemplified as the secondary battery. However, the secondary battery is not limited to those, and the secondary battery to be used may be appropriately selected according to a required characteristic. A configuration and structure of the secondary battery can be a well-known configuration and structure, and a shape of the secondary battery can be a well-known cylindrical shape and square shape. A configuration and structure of the battery pack and the control apparatus can be a well-known configuration and structure. For example, the battery pack can have a configuration in which a plurality of secondary battery groups having the plurality of secondary batteries connected in series is connected in parallel and a configuration in which a plurality of secondary battery groups having the plurality of secondary batteries connected in parallel is connected in series. The electric mobile body may have, for example, an electric double-layer capacitor mounted therein.

First Embodiment

The first embodiment relates to an electric mobile body, a power supply/reception system, and a power receiving method for the electric mobile body of the present disclosure. FIG. 1A is a conceptual diagram of the electric mobile body and the power supply/reception system of the first embodiment.

An electric mobile body 10 of the first embodiment is specifically an electric vehicle. The electric mobile body 10 includes a power reception propriety determination unit 11 which transmits a request signal for requesting to send information about power to a power supply device 20, receives the information about the power from the power supply device 20, and determines whether the power can be received and a power reception unit 12 which receives the power from the power supply device 20.

Also, the power supply/reception system of the first embodiment includes the power supply device 20 and the electric mobile body 10. Here, the electric mobile body 10 includes the above-mentioned electric mobile body. Also, the power supply device 20 specifically includes a charging station (ground charging device). The power supply device 20 receives the request signal from the power reception propriety determination unit 11 of the electric mobile body 10 and includes an information transmission unit 21 which transmits the information about the power to the electric mobile body 10 and a power supply unit 22 which supplies the power to the electric mobile body 10.

The power reception propriety determination unit 11 of the electric mobile body 10 includes a combination of a CPU and a storage unit (memory and the like), and the information transmission unit 21 of the power supply device 20 also includes the combination of the CPU and the storage unit (memory and the like).

The information about the power includes information indicating whether the power is the renewable energy. Also, the information about the power includes information to identify power based on solar power generation, power based on solar thermal power generation, power based on wind power generation, power based on geothermal power generation, power based on biomass power generation, power based on power generation by ocean thermal energy conversion, power based on tidal power, power based on thermal power generation, power based on hydropower generation, power based on natural gas, power based on nuclear power generation, and power based on other power generation (specifically, in the first embodiment, information to identify the power based on the solar power generation and the power based on the thermal power generation, and more specifically, a code indicating the power based on the solar power generation and a code indicating the power based on the thermal power generation).

In the first embodiment, the power supply device 20 includes a plurality of (specifically, two units in the first embodiment) power supply units 22A and 22B. One power supply unit 22A supplies the power based on the solar power generation, and the other power supply unit 22B supplies the power based on the thermal power generation. A solar power generation 31 transmits the power to the power supply device 20 via a power transmission line 32, and the power based on the thermal power generation (commercial power source 33) is transmitted to the power supply device 20 via a power transmission line 34.

In the first embodiment, a contact-type coupler has been employed as a charge coupler for configuring the power reception unit 12 of the electric mobile body 10 and the power supply unit 22 of the power supply device 20. The power reception unit 12 of the electric mobile body 10 and the power supply unit 22 of the power supply device 20 are configured from a well-known and engaging connector. The information about the power is transported by the power. Specifically, the information about the power is transported based on the power line communication (PLC) technique.

The power supplied to the electric mobile body 10 includes a packet structure including a header part and a payload. The payload corresponds to the power, and the header part includes the information about the power, information indicating whether the power is the renewable energy, or information to identify the power based on each power generator. The power reception propriety determination unit 11 includes a packet disassemble unit, and the power reception propriety determination unit 11 can read the information about the power in the header part. It is preferable that the determination by the power reception propriety determination unit 11 whether to receive the power be made based on coincidence/non-coincidence between power generator information or a code and ID regarding a kind of the power included in the header part of the packet structure and power generator information or a code and ID regarding a kind of the power stored in the power reception propriety determination unit 11 of the electric mobile body 10. It is preferable that the user and the like of the electric mobile body 10 previously input the power generator information or the code and ID regarding the kind of the power to the power reception propriety determination unit 11 of the electric mobile body 10.

In the first embodiment, when the power supply device 20 supplies the power to the electric mobile body 10, for example, the user of the electric mobile body 10 or an operator of the power supply device 20 specifically engages connectors (not shown). The power reception unit 12 of the electric mobile body 10 and the power supply unit 22 of the power supply device 20 are configured by the connectors. Terminals provided in the respective connectors contact with each other, and a connector connection is confirmed based on a well-known method. When the user of the electric mobile body 10 pushes a power reception start button (not shown) arranged in the electric mobile body 10, the power reception propriety determination unit 11 of the electric mobile body 10 transmits the request signal for requesting to send the information about the power to the power supply device 20 (specifically, information transmission unit 21) via the connector. Under the control by the information transmission unit 21, the power supply device 20 which has received the request signal transmits the information about the power to the electric mobile body 10 in a state in which the information is transported by the power. The power reception propriety determination unit 11 which has received the information about the power from the power supply device 20 determines whether the power can be received. Specifically, the power reception propriety determination unit 11 determines that the power can be received when the information about the power is the renewable energy. Also, the power reception propriety determination unit 11 determines that the power can be received when the information about the power is the information for identifying that the power is the renewable energy and the green energy such as the power based on the solar power generation, the power based on the solar thermal power generation, the power based on the wind power generation, the power based on the geothermal power generation, the power based on the biomass power generation, the power based on the power generation by ocean thermal energy conversion, and the power based on the tidal power. On the other hand, when the power is other than the above, the power reception propriety determination unit 11 determines not to receive the power.

More specifically, when the power reception unit 12 of the electric mobile body 10 is connected to the power supply unit 22A of the power supply device 20, the power reception propriety determination unit 11 determines that the power can be received. Next, the power reception propriety determination unit 11 transmits the power supply request signal for requesting the power supply to the power supply device 20 and requests the power supply device 20 to supply the power. Here, the power supply request signal includes information about a power supply method, specifically, information to distinguish a normal charge method from a rapid charge method to charge a secondary battery provided in the electric mobile body 10. The power supply device 20 which has received the power supply request signal supplies the power having the appropriate specification to the electric mobile body 10 via the power supply unit 22 and the power reception unit 12 based on the information about the power supply method. That is, the electric mobile body 10 receives the power from the power supply device 20. The electric mobile body 10 charges the battery pack (refer to FIG. 6) according to the power based on a well-known method. After that, it is preferable to complete the reception of the power from the power supply device 20 based on the well-known method.

On the other hand, when the power reception unit 12 of the electric mobile body 10 is connected to the power supply unit 22B of the power supply device 20, the power reception propriety determination unit 11 determines that the power cannot be received. Then, the power reception propriety determination unit 11 displays on a display unit (not shown) provided in the electric mobile body 10 that the power cannot be received.

In the electric mobile body or the power supply/reception system of the first embodiment, the electric mobile body includes the power reception propriety determination unit which transmits the request signal for requesting to send the information about power to the power supply device, receives the information about the power from the power supply device, and determines whether the power can be received. Also, the power receiving method for the electric mobile body of the first embodiment is to transmit the request signal for requesting to send the information about the power to the power supply device, receive the information about the power from the power supply device, and determine whether the power can be received based on the information about the power. Therefore, a user and the like of the electric mobile body can surely receive the power from a power generator from which the user desires to receive the power (for example, renewable energy and green energy). On the other hand, the user can surely reject to receive the power from the power generator from which the user does not desire to receive the power.

Second Embodiment

Figure 1B:
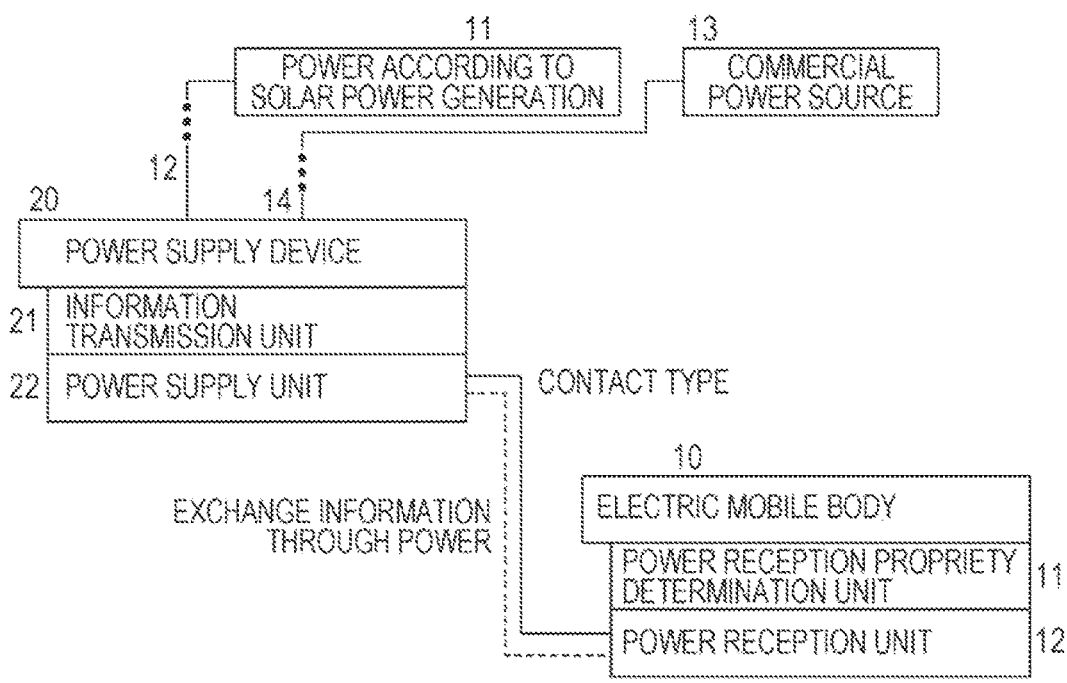

A second embodiment is a modification of the first embodiment. In the second embodiment, a power supply device 20 includes a single power supply unit 22 as illustrated in FIG. 1B. The power supply unit 22 supplies power based on solar power generation or power based on thermal power generation.

In the second embodiment, when the power supply device 20 supplies the power to an electric mobile body 10, connectors (not shown) are engaged similarly to the first embodiment. A power reception unit 12 of the electric mobile body 10 and the power supply unit 22 of the power supply device 20 are configured by the connectors. When a user of the electric mobile body 10 pushes a power reception start button (not shown) arranged in the electric mobile body 10, a power reception propriety determination unit 11 of the electric mobile body 10 transmits a request signal for requesting to send information about the power to the power supply device 20 (specifically, information transmission unit 21) via the connector. Under the control by the information transmission unit 21, the power supply device 20 which has received the request signal transmits the information about the power to the electric mobile body 10 in a state in which the information is transported by the power.

At this point of time, for example, the power based on the thermal power generation (commercial power source 33) is transmitted to the power supply device 20 via a power transmission line 34, and the power supply device 20 can transmit only the power based on the thermal power generation (commercial power source 33) to the electric mobile body 10. The power reception propriety determination unit 11 which has received the information about the power from the power supply device 20 determines whether the power can be received. Specifically, since the information about the power is not renewable energy, the power reception propriety determination unit 11 determines not to receive the power. Then, the power reception propriety determination unit 11 displays on a display unit (not shown) provided in the electric mobile body 10 that the power cannot be received.

On the other hand, at this point of time, for example, it is assumed that the power based on the solar power generation 31 be transmitted to the power supply device 20 via the power transmission line 32 and the power supply device 20 can supply only the power based on the solar power generation 31 to the electric mobile body 10. The power reception propriety determination unit 11 which has received the information about the power from the power supply device 20 determines whether the power can be received. Specifically, since the information about the power is the renewable energy, the power reception propriety determination unit 11 determines to receive the power. Next, the power reception propriety determination unit 11 transmits the power supply request signal for requesting the power supply to the power supply device 20 and requests the power supply device 20 to supply the power. The power supply request signal includes information about the power supply method similarly to the first embodiment. The power supply device 20 which has received the power supply request signal supplies the power having the appropriate specification to the electric mobile body 10 via the power supply unit 22 and the power reception unit 12 based on the information about the power supply method. That is, the electric mobile body 10 receives the power from the power supply device 20.

Except for the above point, the electric mobile body, the power supply/reception system, and the power receiving method for the electric mobile body of the second embodiment can be similar to those of the first embodiment. Therefore, the detailed description is omitted.

Third Embodiment

Figure 2A:
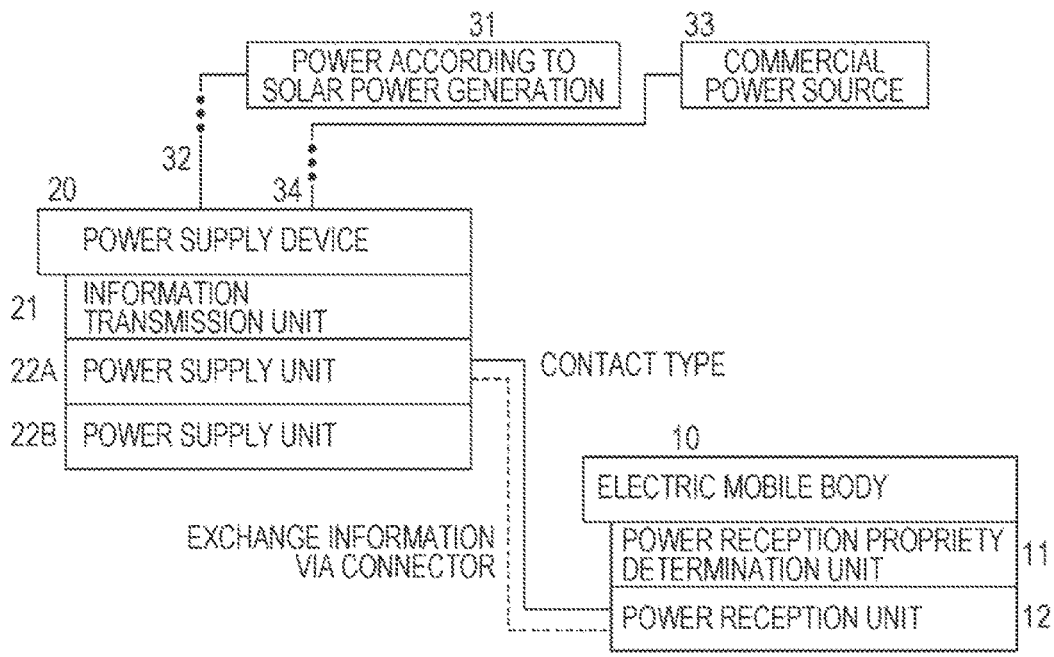
FIGS. 2A and 2B are conceptual diagrams of an electric mobile body and a power supply/reception system of a third embodiment.
Figure 2B:
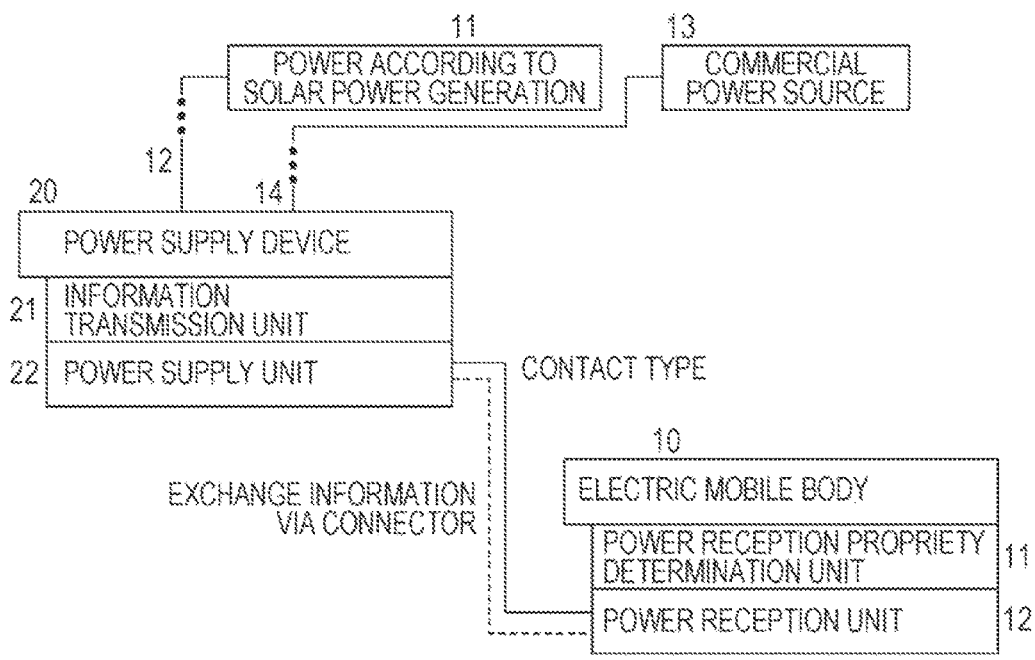

A third embodiment is a modification of the first and the second embodiments. FIG. 2A is a conceptual diagram of an electric mobile body and a power supply/reception system of the third embodiment as the modification of the first embodiment. FIG. 2B is a conceptual diagram of an electric mobile body and a power supply/reception system of the third embodiment as the modification of the second embodiment. In the third embodiment, information about the power is not transported by the power and transported via connectors. A power reception unit 12 of an electric mobile body 10 and a power supply unit 22 of a power supply device 20 are configured by the connectors. Except for the above point, the electric mobile body, the power supply/reception system, and the power receiving method for the electric mobile body of the third embodiment can be similar to those of the first and second embodiments. Therefore, the detailed description is omitted.

Fourth Embodiment

Figure 3A:
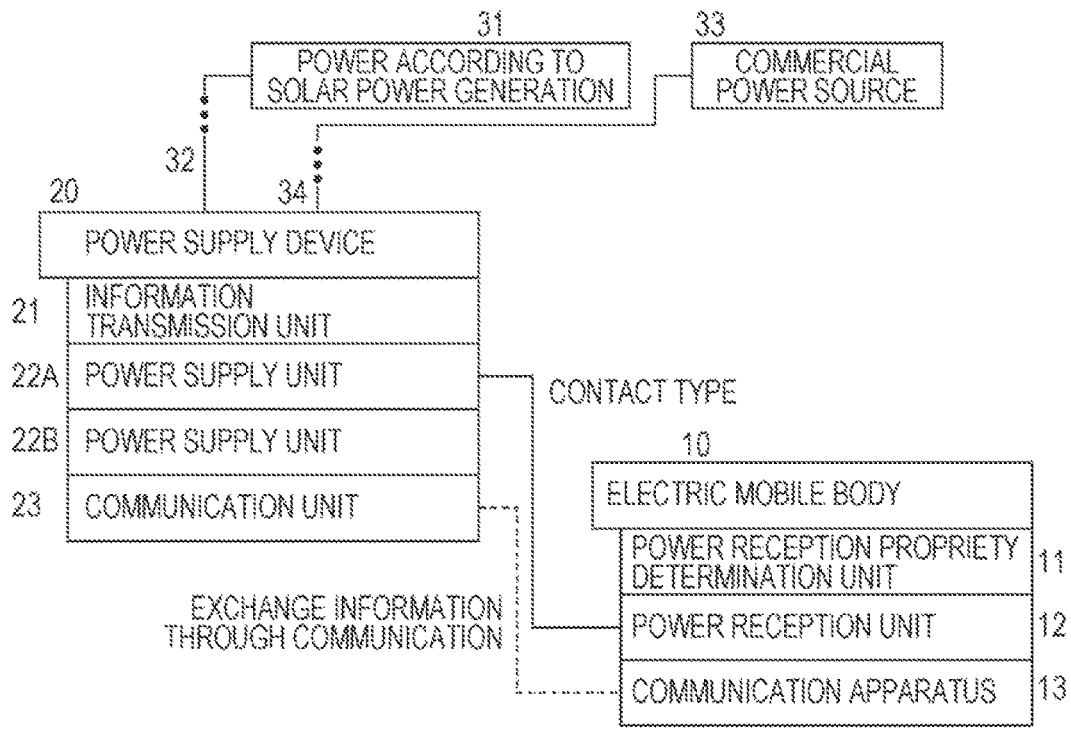
FIGS. 3A and 3B are conceptual diagrams of an electric mobile body and a power supply/reception system of a fourth embodiment.
Figure 3B:
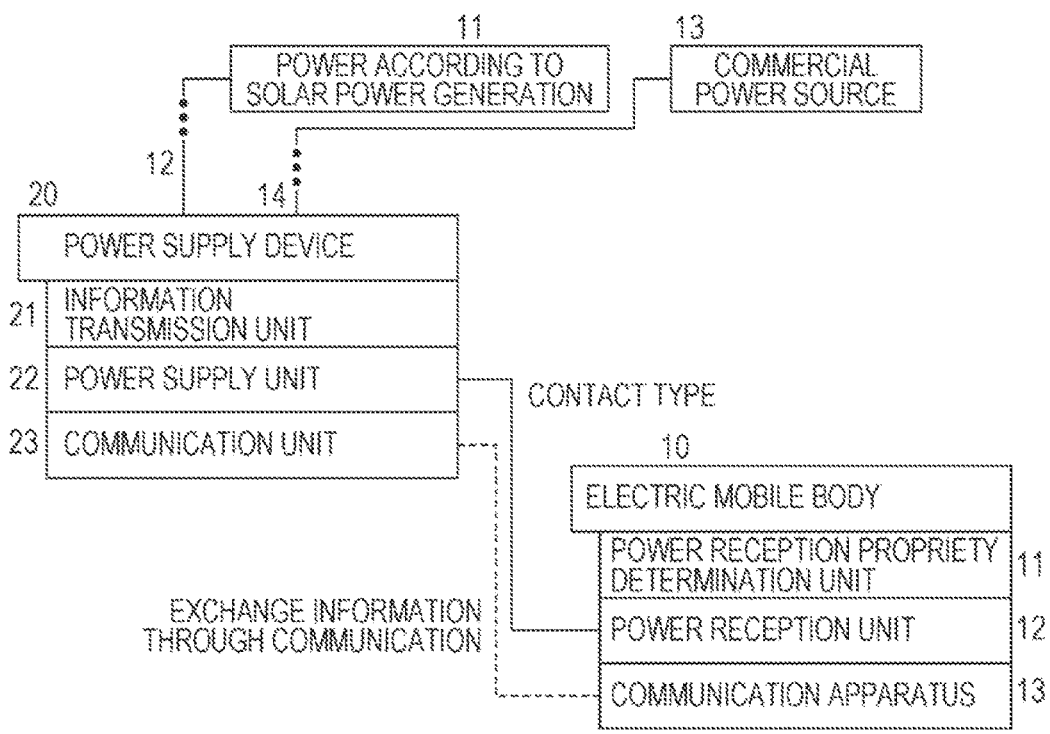

A fourth embodiment is also a modification of the first and second embodiments. FIG. 3A is a conceptual diagram of an electric mobile body and a power supply/reception system of the fourth embodiment as the modification of the first embodiment. FIG. 3B is a conceptual diagram of an electric mobile body and a power supply/reception system of the fourth embodiment as the modification of the second embodiment. In the fourth embodiment, an electric mobile body 10 further includes a communication apparatus 13. Also, a power supply device 20 (specifically, information transmission unit 21) includes a communication unit 23. A request signal and information about the power are wirelessly transmitted/received by using the communication apparatus 13 and the communication unit 23. That is, exchange of the information and the like between the communication apparatus 13 and the information transmission unit 21 is wirelessly performed. The power reception propriety determination unit 11 determines whether to receive the power based on coincidence/non-coincidence between power generator information or a code and ID regarding a kind of the power wirelessly transmitted and power generator information or a code and ID regarding a kind of the power stored in the power reception propriety determination unit 11 of the electric mobile body 10. The power supplied to the electric mobile body 10 may include a packet structure and be normal power.

Except for the above point, the electric mobile body, the power supply/reception system, and the power receiving method for the electric mobile body of the fourth embodiment can be similar to those of the first and second embodiments. Therefore, the detailed description is omitted.

Fifth Embodiment

Figure 4A:
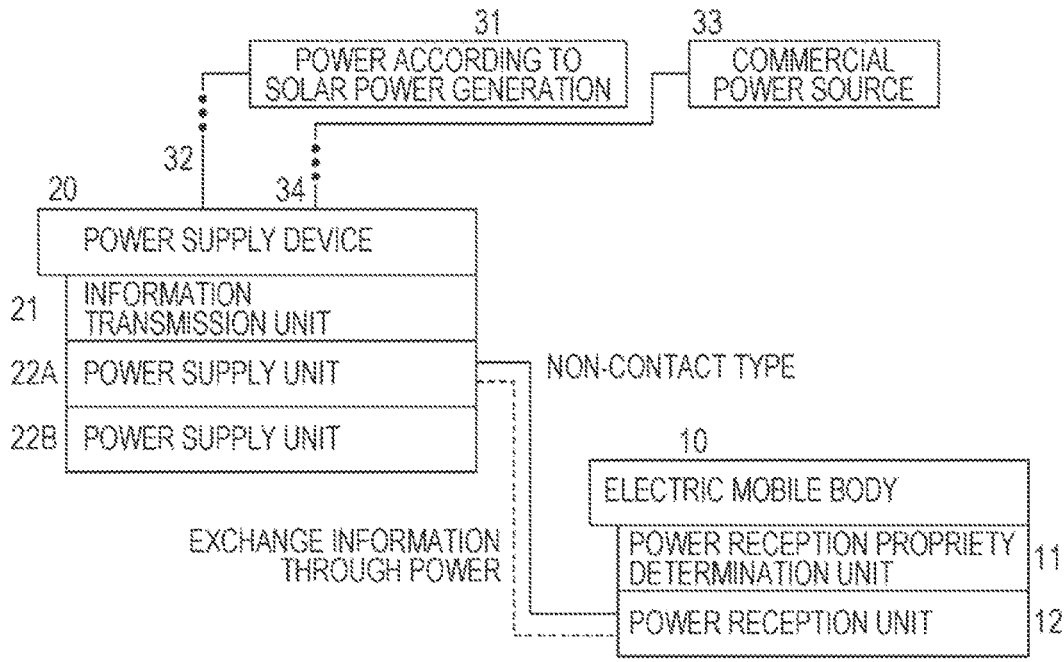
FIGS. 4A and 4B are conceptual diagrams of an electric mobile body and a power supply/reception system of a fifth embodiment.
Figure 4B:
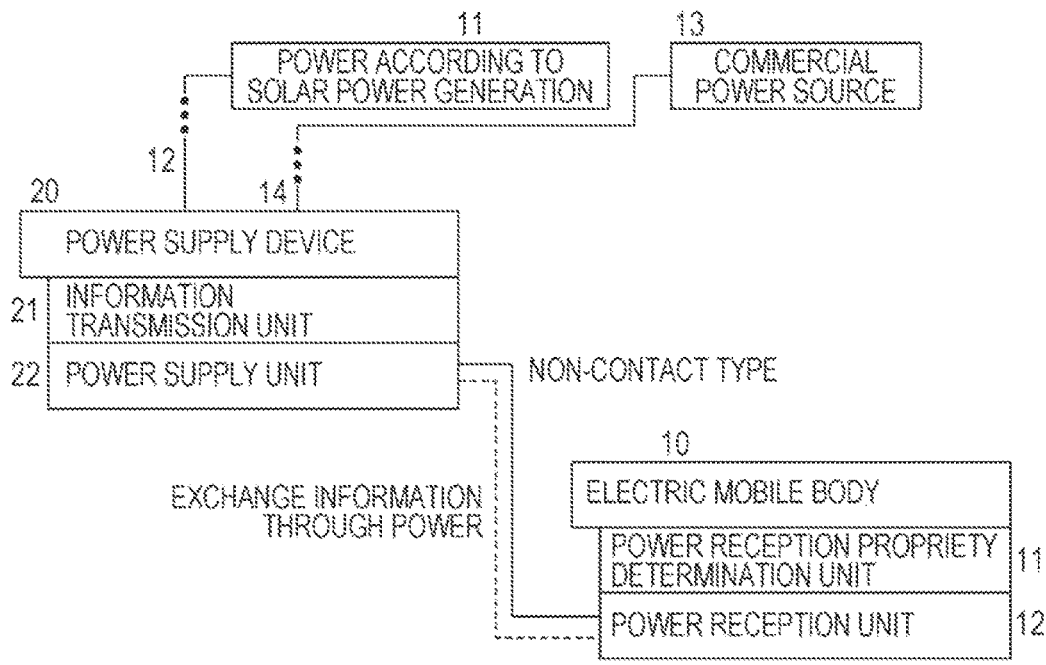
Figure 5A:
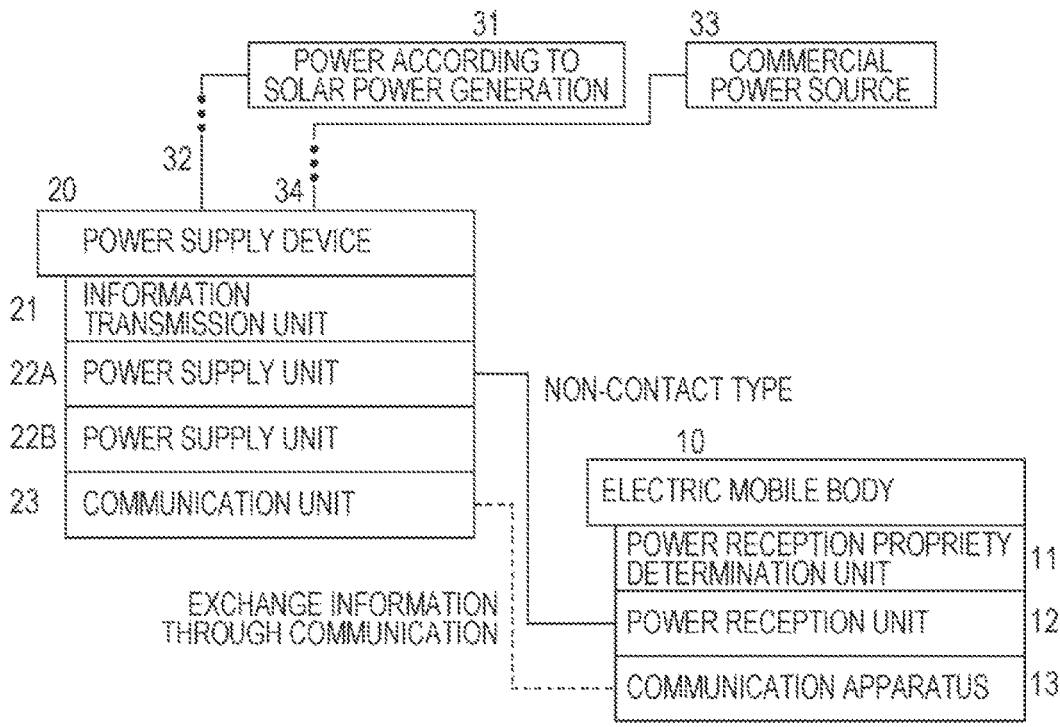
FIGS. 5A and 5B are conceptual diagrams of modifications of the electric mobile body and the power supply/reception system of the fifth embodiment.
Figure 5B:
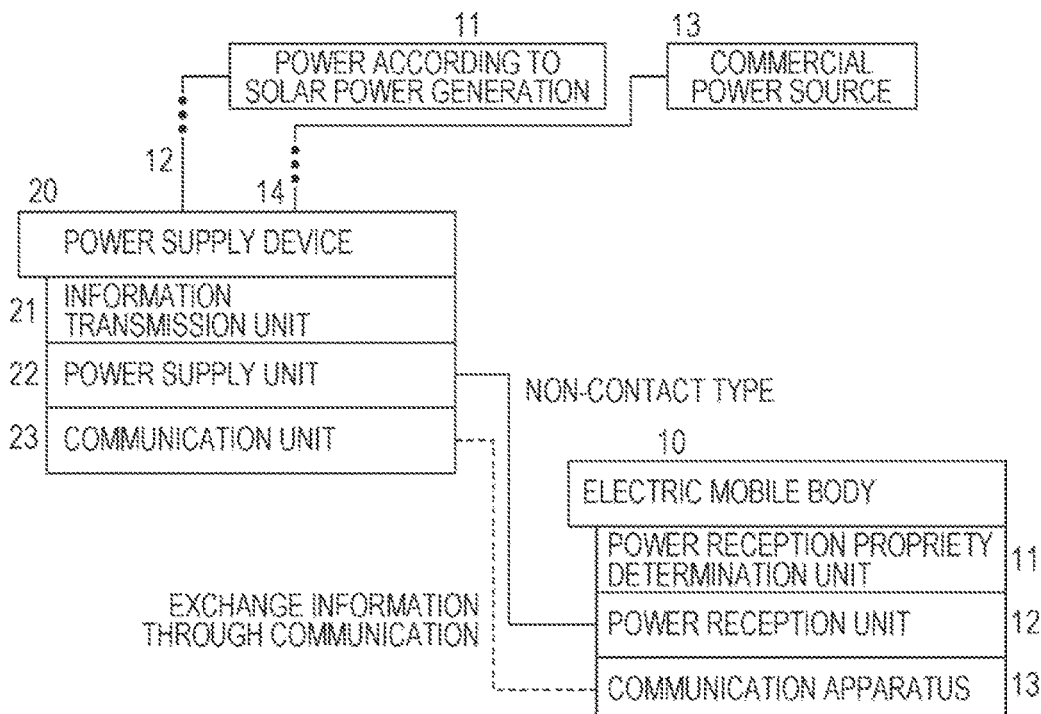

A fifth embodiment is a modification of the first to fourth embodiments. FIG. 4A is a conceptual diagram of an electric mobile body and a power supply/reception system of the fifth embodiment as the modification of the first embodiment, and FIG. 4B is a conceptual diagram of an electric mobile body and a power supply/reception system of the fifth embodiment as the modification of the second embodiment. FIGS. 5A and 5B are conceptual diagrams of an electric mobile body and a power supply/reception system of the fifth embodiment as the modification of the third embodiment.

In the first to fourth embodiments, it has been assumed that a charge coupler including a power reception unit of the electric mobile body and a power supply unit of the power supply device be a contact type. However, it is assumed that the charge coupler be a non-contact type in the fifth embodiment. Specifically, a power supply device 20 supplies the power to an electric mobile body 10 by combining a power transmission antenna (included in a power supply unit 22) with a power reception rectenna (included in a power reception unit 12), facing a coil (included in the power supply unit 22) to a coil (included in the power reception unit 12), or combining a power transmission side antenna (included in the power supply unit 22) with a power reception side antenna (included in the power reception unit 12) based on any one of the four methods, i.e., a microwave method, an electromagnetic induction method, a magnetic field resonance method, and an electric field resonance method.

Except for the above point, the electric mobile body, the power supply/reception system, and the power receiving method for the electric mobile body of the fifth embodiment can be similar to those of the first to fourth embodiments. Therefore, the detailed description is omitted.

Sixth Embodiment

Figure 6:
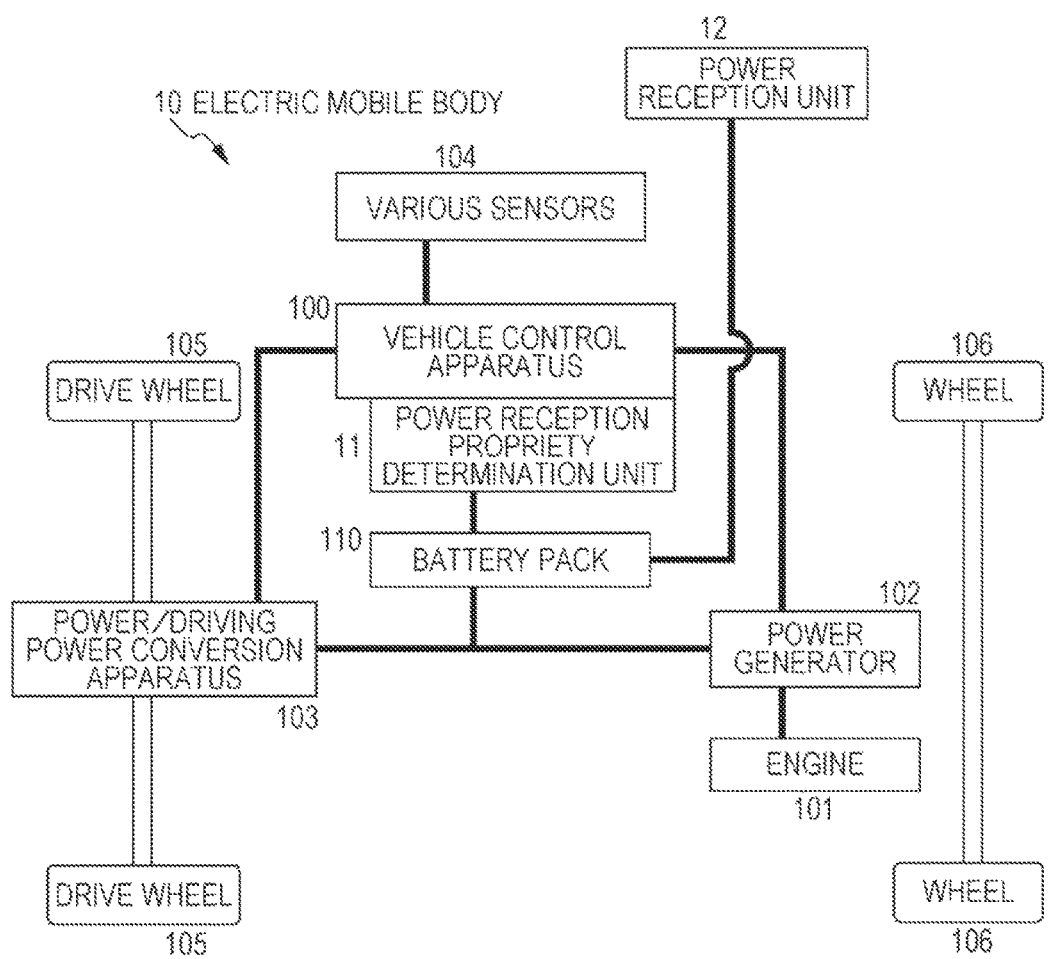
FIG. 6 is a conceptual diagram of an electric mobile body (electric vehicle) of a sixth embodiment.

A sixth embodiment relates to an electric vehicle. FIG. 6 is a configuration of a hybrid vehicle of the sixth embodiment. The electric vehicle of the sixth embodiment is an automobile which travels by a power/driving power conversion apparatus 103 by using power generated by a power generator 102 driven by an engine 101 or by temporarily accumulating the power generated by the power generator 102 in a battery pack 110 and using the power from the battery pack 110. For example, the electric vehicle further includes a vehicle control apparatus 100, various sensors 104, a power reception unit 12, drive wheels 105, and wheels 106. The vehicle control apparatus 100 includes a power reception propriety determination unit 11 and a control apparatus (not shown) for charging/discharging a battery pack.

The electric vehicle of the sixth embodiment travels while having the power/driving power conversion apparatus 103 as a power source. The power/driving power conversion apparatus 103 includes, for example, a motor for driving. For example, the power/driving power conversion apparatus 103 is operated by the power of the battery pack 110, and a torque of the power/driving power conversion apparatus 103 is transmitted to the drive wheels 105. Both an AC motor and a DC motor can be applied as the power/driving power conversion apparatus 103. The various sensors 104 control an engine rotation speed and control an opening of a throttle valve (throttle opening) which is not shown via the vehicle control apparatus 100. The various sensors 104 include a speed sensor, an acceleration sensor, an engine rotation speed sensor, and the like. The torque of the engine 101 is transmitted to the power generator 102, and power generated by the power generator 102 by the torque is accumulated in the battery pack 110.

When the speed of the electric vehicle is reduced by a braking mechanism which is not shown, a resistance at the time of reducing the speed is added to the power/driving power conversion apparatus 103 as the torque, and a regenerative power generated by the power/driving power conversion apparatus 103 by the torque is accumulated in the battery pack 110. Also, the power supply device 20 supplies the power to the battery pack 110 having the power reception unit 12 as an input port, and the battery pack 110 can accumulate the power. Also, the battery pack 110 having the power reception unit 12 as an output port can supply the accumulated power to the outside.

The description has been made based on a series hybrid vehicle for traveling by the power/driving power conversion apparatus 103 by using the power generated by the power generator 102 driven by the engine 101 and the power temporarily accumulated in the battery pack 110. However, the vehicle can be a parallel hybrid vehicle which switches three methods and uses them. Three methods, in which either the engine 101 and the power/driving power conversion apparatus 103 are used as a driving source, are a travel by using the engine 101, a travel by using the power/driving power conversion apparatus 103, and a travel by using both the engine 101 and the power/driving power conversion apparatus 103. Also, the vehicle can be a series parallel hybrid vehicle and a plug-in hybrid vehicle. Also, the vehicle may travel according to the motor for driving without using the engine.

The present disclosure may have a configuration as follows.

[1] <<Electric Mobile Body>>
An electric mobile body including:
a power reception propriety determination unit configured to transmit a request signal for requesting to send information about power to a power supply device, receive the information about the power from the power supply device, and determine whether the power can be received; and
a power reception unit configured to receive the power from the power supply device.

[2] The electric mobile body according to [1], wherein
the power reception propriety determination unit transmits a power supply request signal for requesting power supply to the power supply device when the power reception propriety determination unit has determined to receive the power.

[3] The electric mobile body according to [2], wherein
the power supply request signal includes information about a power supply method.

[4] The electric mobile body according to [1] or [2], wherein
the information about the power includes information indicating whether the power is renewable energy.

[5] The electric mobile body according to [1] or [2], wherein
the information about the power includes information to identify power based on solar power generation, power based on solar thermal power generation, power based on wind power generation, power based on geothermal power generation, power based on biomass power generation, power based on power generation by ocean thermal energy conversion, power based on thermal power generation, power based on hydropower generation, power based on nuclear power generation, and power based on other power generation.

[6] The electric mobile body according to any one of [1] to [5], wherein
the information about the power is transported by the power.

[7] The electric mobile body according to any one of [1] to [5], further including:
a communication apparatus, wherein
the request signal and the information about the power are transmitted/received via the communication apparatus.

[8] <<Power Supply/Reception System>>
A power supply/reception system including:
a power supply device; and
an electric mobile body, wherein
the electric mobile body includes
a power reception propriety determination unit which transmits a request signal for requesting to send information about power to the power supply device, receives the information about the power from the power supply device, and determines whether the power can be received, and
a power reception unit which receives the power from the power supply device, and
the power supply device includes
an information transmission unit which receives the request signal from the power reception propriety determination unit of the electric mobile body and transmits the information about the power to the electric mobile body, and
a power supply unit which supplies the power to the electric mobile body.

[9] The power supply/reception system according to [8], wherein
the power reception propriety determination unit of the electric mobile body transmits a power supply request signal for requesting power supply to the power supply device when the power reception propriety determination unit of the electric mobile body has determined to receive the power.

[10] <<Power Receiving Method for Electric Mobile Body>>
A power receiving method for an electric mobile body including:
transmitting a request signal for requesting to send information about power to a power supply device;
receiving the information about the power from the power supply device;
determining whether the power can be received based on the information about the power; and
receiving the power from the power supply device when a determination to receive the power has been made.

[11] The power receiving method for an electric mobile body according to [10], wherein
the power supply device is requested to supply the power when the determination to receive the power has been made.

REFERENCE SIGNS LIST

10 electric mobile body
11 power reception propriety determination unit
12 power reception unit
20 power supply device (charging station, ground charging device)
21 information transmission unit
22, 22A, 22B power supply unit
31 solar power generation
33 thermal power generation (commercial power source)
32, 34 power transmission line
100 vehicle control apparatus
101 engine
102 power generator
103 power/driving power conversion apparatus
104 various sensors
105 drive wheel
106 wheel
110 battery pack

The invention claimed is:
1. An electric mobile body comprising:
a power reception propriety determination unit configured to
transmit, to a power supply device, a request signal for requesting the power supply device to send information about power that the power supply device can supply, receive the information about the power from the power supply device, wherein the information indicates whether the power supply device supplies the power from a single power supply generator or from at least two or more power supply generators, determine, based on the received information about the power, whether the power can be received, and transmits, to the power supply device, a power supply request signal for requesting a supplying of power when the power is determined to be receivable, and a power reception unit configured to receive the power from the power supply device, wherein the power reception property determination unit and the power reception unit are each implemented via at least one processor.

2. The electric mobile body according to claim 1, wherein the power supply request signal includes information about a power supply method.

3. The electric mobile body according to claim 1, wherein the information about the power includes information indicating whether the power is renewable energy.

4. The electric mobile body according to claim 1, wherein the information about the power includes information to identify power based on solar power generation, power based on solar thermal power generation, power based on wind power generation, power based on geothermal power generation, power based on biomass power generation, power based on power generation by ocean thermal energy conversion, power based on thermal power generation, power based on hydropower generation, power based on nuclear power generation, and power based on other power generation.

5. The electric mobile body according to claim 1, wherein the information about the power is transported by the power.

6. The electric mobile body according to claim 1, further comprising:

a communication apparatus, wherein the request signal and the information about the power are transmitted/received via the communication apparatus.

7. The electrical mobile body according to claim 1, wherein the power reception propriety determination unit is further configured to determine that the power cannot be received based on the received information about the power.

8. The electrical mobile body according to claim 3, wherein the power reception propriety determination unit is further configured to reject the power when the received information about the power indicates the power is not associated with renewable energy.

9. The electrical mobile body according to claim 1, wherein the information about the power further includes information of a power transmission source.

10. The electrical mobile body according to claim 1, wherein the information about the power further includes information of carbon dioxide emissions per power generation unit time.

11. The electrical mobile body according to claim 1, wherein the information about the power further includes a flag for distinguishing commercial or private owner.

12. A power receiving method for an electric mobile body, the method being executed via at least one processor, and the method comprising:

transmitting, to a power supply device, a request signal for requesting the power supply device to send information about power that the power supply device can supply;

receiving the information about the power from the power supply device;

determining whether the power can be received based on the received information about the power;

transmitting, to the power supply device, a power supply request signal for requesting a supplying of power when the power is determined to be receivable; and receiving the power from the power supply device, wherein the information about the power indicates whether the power supply device supplies the power from a single power supply generator or from at least two or more power supply generators.

* * * * *